United States Patent Office 2,720,462
Patented Oct. 11, 1955

2,720,462
REFRACTORY PRODUCTS

James Dennis Jones, Leaside, Ontario, Canada, assignor to Ontario Research Foundation, Toronto, Ontario, Canada, a corporation of Ontario No Drawing. Application November 28, 1950,
Serial No. 198,045

9 Claims. (Cl. 106—58)

This invention relates to a clayless refractory product as a new article of manufacture adapted to be employed at a higher temperature than that at which it is formed and to the method of making same.

I am aware that refractory compounds containing clay have been made from so-called mineral silica, a binder and water with or without lime and that high concentrations of silica have been employed in such compositions. I am also aware that silica derived from rice hull ash has heretofore been employed as a silica ingredient in refractory compositions.

However, it has not to my knowledge been heretofore proposed that a refractory composition be solely constituted by a very high proportion of silica derived from rice hull ash with an accompanying amount of lime to form a silica-lime bond of a nature giving rise to unusual dimensional stability over relatively wide ranges of temperature to such a degree that the composition may be fired and finished as an article such as a brick or the like at a lower temperature than the temperature at which it is intended to be used.

I have also found that apparently complete dimensional stability of a composition according to my invention may be provided by employing silica derived from two forms of rice hull ash, the said forms being a so-called "pink ash" and "black ash" whereby the combination of such materials results in substantially negligible shrinkage or expansion at least within the operating ranges of temperatures to be experienced by a final composition.

Having regard to the foregoing, the composition of the invention comprises rice hull ash present in the amount of 80% to 98% by weight of the final composition, calcium oxide constituting substantially the remainder of the composition but including a small percentage (say 4% to 0.5%) of an organic binder such as pre-gelatinized rice flour or equivalent for "green strength" before baking.

The method of the invention embodies adding water to the above mix to wet the same, pressing the mix and drying, and firing at a temperature lower than the final temperature at which the composition is to be used.

According to the invention, rice hull ash is employed as the silica component in the refractory composition. Typical analysis of the true ash is as follows:

|  | Per cent |
|---|---|
| $SiO_2$ | 96.5 |
| $CaO$ | 0.25 |
| $MgO$ | 0.25 |
| $K_2O$ | 1.00 |
| $Na_2O$ | 0.4 |
| $P_2O_5$ | 0.3 |
| $SO_2$ | 1.00 |
| $Cl$ | Trace |
| $Fe_2O_3$ | Trace |
| $MnO_2$ | Trace |

The silica in the ash is largely in the cristobalite and tridymite forms somewhat resembling kieselguhr but differing in that the ash has a higher silica content free from clay substances and has a uni-cellular microscopic porosity.

When the rice hulls are completely burned a "pink ash" results. The term "black ash" employed herein is intended to indicate an ash in which a small percentage of carbon still remains usually present in an amount of about 2% to 3% by weight. Preferably the composition of the invention is of the class in which a rice hull ash silica-alkaline-earth metal oxide type of bond is constituted. Preferably lime is the alkaline-earth metal compound employed not only as a flux during firing but as a constituent of the final bond.

The term "alkaline earth metal" is used in the sense in which such term is ordinarily used and in the additional sense that thereby magnesium is intended to be included.

The term "oxide" occurring in the claims is used in the sense in which such term is ordinarily used and in the additional sense that thereby hydroxides and like materials are intended to be included, except where the context indicates a different intention.

The term "lime" is used in the sense of including calcium oxide and calcium hydroxide.

In mixing the desired composition, lime is mixed with either a "pink ash" or a "black ash," following which a suitable quantity of organic binder such as pregelatinized rice flour is mixed in and sufficient water added to activate the binder without introducing such an amount that it would be expelled during a pressing process. The mixture may be press-moulded in a standard brick moulding machine, the pressure depending upon the bulk density and other related properties required in the final brick. The brick is then dried, this being easily accomplished by conventional methods due to the porosity of the mixture. The bricks are then fired preferably at a temperature between 2550° Fahrenheit and 2900° Fahrenheit.

In order to illustrate the influence of lime content and the type of product obtained with the "pink ash" as compared with the "black ash" a series of duplicate samples were prepared and pressed at 432 pounds per square inch, Table 1 illustrating the range in composition as follows:

Table 1

Dry mixing was employed; the introduction of the lime preceding the binder.

| No. | Percent CaO | Pink Ash, gm. | Black Ash, gm. | Pre-gelatinized Rice Flour, gm. | Slaked Lime, gm. | Water, ml. |
|---|---|---|---|---|---|---|
| 1 | 0 | 30 | | 0.9 | | 9.0 |
| 1a | 0 | | 30 | 0.9 | | 9.0 |
| 2 | 1 | 30 | | 0.9 | 0.396 | 9.0 |
| 2a | 1 | | 30 | 0.9 | 0.396 | 9.0 |
| 3 | 2 | 30 | | 0.9 | 0.792 | 9.0 |
| 3a | 2 | | 30 | 0.9 | 0.792 | 9.0 |
| 4 | 3 | 30 | | 0.9 | 1.188 | 9.0 |
| 4a | 3 | | 30 | 0.9 | 1.188 | 9.0 |
| 5 | 4 | 30 | | 0.9 | 1.584 | 9.0 |
| 5a | 4 | | 30 | 0.9 | 1.584 | 9.0 |
| 6 | 5 | 30 | | 0.9 | 1.98 | 9.0 |
| 6a | 5 | | 30 | 0.9 | 1.98 | 9.0 |

The above samples were allowed to dry at room temperature overnight and fired at 2600° Fahrenheit. Shrinkage was determined across the circular face of each sample, samples being formed in a small cylindrical steel mould of four square inches cross-section. The diameter was taken as the arithmetical mean of two diameters mutually perpendicular. Table 2 shows the shrinkage occurring for the above samples of Table 1 on firing up to 2600° Fahrenheit in seven hours and maintaining the maximum firing temperature for one hour.

Table 2

Shrinkage on firing to 2600° F. and "soaking" for 1 hour:

| No. | Percent CaO | Pre-firing diameter, cm. | Fired diameter, cm. | Shrinkage | Percent Shrinkage |
|---|---|---|---|---|---|
| 1   | 0 | 5.80 | 5.84 | −0.04 | −0.69 |
| 1a  | 0 | 5.80 | 5.80 |       | 0 |
| 2   | 1 | 5.81 | 5.83 | −0.02 | −0.34 |
| 2a  | 1 | 5.83 | 5.80 | +0.03 | +0.52 |
| 3   | 2 | 5.83 | 5.87 | −0.04 | −0.69 |
| 3a  | 2 | 5.81 | 5.80 | +0.01 | +0.17 |
| 4   | 3 | 5.82 | 5.86 | −0.04 | −0.69 |
| 4a  | 3 | 5.82 | 5.80 | +0.02 | +0.34 |
| 5   | 4 | 5.82 | 5.86 | −0.04 | −0.69 |
| 5a  | 4 | 5.83 | 5.80 | +0.03 | +0.52 |
| 6   | 5 | 5.81 | 5.84 | −0.03 | −0.52 |
| 6a  | 5 | 5.81 | 5.80 | +0.01 | +0.17 |

Experiments giving rise to the above tables and experiments conducted since that time clearly show that shrinkage is low but that the "pink ash" specimens are even less subject to this effect. Moreover, the dimensional change of the "pink ash" is of opposite sign to that occurring in specimens of the "black ash" particularly in compositions having a lime content between 2% and 7% by weight. It has thus been found that extreme dimensional stability may be provided by combining the "black ash" and "pink ash" in proportions such that their dimensional changes are substantially balanced. For all practical purposes it would appear that substantially equal quantities of these two types of rice hull ash in a refractory composition according to the invention results in a dimensionally stable product in the true sense.

Although the percentage of water employed is governed not only by the excess which may be lost on pressing but also by the type of organic binder used, it has been found that with the type of organic binder specified herein 30% to 40% by weight of water may be employed to give a suitable "green strength" and short drying time. It has been found that relatively high percentages of lime up to 20 percent may be incorporated in the mix but that there is increased shrinkage with higher concentrations. The shrinkage effect, however, is still slight. Forming pressure appears to have the usual influence on the final crushing strength.

A series of brick sizes of about 9¾ by 4½ by 2½ were made and tested wherein specimens illustrated a dimensional change of less than 1% on firing to 2600° Fahrenheit.

In respect to bulk density, it has been found that compositions according to the invention range in bulk density from 0.55 to 1.00 in a range of forming pressure from 117 to 9360 pounds per square inch. At a preferred forming pressure of about 550 pounds per square inch, bulk density will be of the order of about 0.7, the apparent specific gravity of the order of 2.1 and the apparent porosity of the order of about 70%.

In respect to cold crushing strength, values between 350 and 400 pounds per square inch are derived from samples of composition No. 6 of an apparent specific gravity of the order of 2.2 and an apparent porosity of about 66%.

It will be observed from the foregoing that the compositions of the invention give rise to stable refractory compositions in respect to dimensional characteristics and also that the product is of a type which may be fired at a lower temperature than that at which it is to be used. Moreover, the dimensional stability of the compositions herein allow bricks to be pressed from the composition rather than requiring the usual expedient of cutting the bricks to size as is generally practised with refractory insulating materials.

A preferred composition herein may comprise a mixture of "black" and "pink" rice hull ash in substantially equal proportions along with about 5% lime, fired at about 2650° Fahrenheit for use up to temperatures of 3000° Fahrenheit. Heating of numerous samples originally fired at 2600° Fahrenheit to a temperature of 2900° Fahrenheit illustrated no discernible change in dimensional characteristics.

It is intended that the present disclosure should not be construed in any limiting sense other than that indicated by the scope of the following claims.

What I claim as my invention is:

1. A refractory product adapted to maintain its dimensional stability up to 3000° F. and formed at a firing temperature substantially less than 3000° F. and consisting of a mixture fired at said lower temperature comprising in combination rice hull ash being a mixture of the class of "pink" and "black" ash having silica present principally in cristobalite and tridymite forms, and an alkaline earth metal oxide present in an amount of less than 20% by weight of the mix adapted to form a silica-alkaline earth metal oxide bond with said silica when the mixture is fired at said firing temperature, the said alkaline earth metal oxide being substantially the sole constituent in said mix adapted to form a ceramic bond with the silica thereof, and an organic binder in said mix for providing "green" strength thereof before firing but carbonizable at firing temperatures.

2. A refractory product adapted to maintain its dimensional stability up to 3000° F. and formed at a firing temperature substantially less than 3000° F. and consisting of a mixture fired at said lower temperature comprising in combination: rice hull ash being a mixture of the class of "pink" and "black" ash having silica present principally in cristobalite and tridymite forms, and an alkaline earth metal oxide present in an amount of less than 20% by weight of the mix adapted to form a silica-alkaline earth metal oxide bond with said silica when the mixture is fired at said firing temperature, the said alkaline earth metal oxide being substantially the sole constituent in said mix adapted to form a ceramic bond with the silica thereof, and an organic binder in said mix for providing "green" strength thereof before firing but carbonizable at firing temperatures, the "black" and "pink" ash constituents of said rice hull ash giving rise to oppositely moving dimensional changes in said product as the latter is subjected to changes in temperature, the said "black" and "pink" ash being proportioned to substantially cancel their respective dimensional changes with temperature.

3. A clayless refractory product adapted to maintain its dimensional stability up to 3000° F. and formed at a firing temperature substantially less than 3000° F. and consisting of a mixture fired at said lower temperature comprising in combination: rice hull ash having silica present principally in cristobalite and tridymite forms, and an alkaline earth metal oxide present in an amount of between 2% and 7% by weight of the mix adapted to form a silica-alkaline earth metal oxide bond with said silica when the mixture is fired at said firing temperature, the said alkaline earth metal oxide being substantially the sole constituent in said mix adapted to form a ceramic bond with the silica thereof, and an organic binder in said mix for providing "green" strength thereof before firing but carbonizable at firing temperatures.

4. A clayless refractory product adapted to maintain its dimensional stability up to 3000° F. and formed at a firing temperature substantially less than 3000° F. and consisting of a mixture fired at said lower temperature comprising in combination: rice hull ash principally of the "pink" class and having silica present principally in cristobalite and tridymite forms, and an alkaline earth metal oxide present in an amount of between 2% and 7% by weight of the mix adapted to form a silica-alkaline earth metal oxide bond with said silica when the mixture is fired at said firing temperature, the said alkaline earth metal oxide being substantially the sole constituent in said mix adapted to form a ceramic bond with the silica thereof, and an organic binder in said mix for providing "green" strength thereof before firing but carbonizable at firing temperatures.

5. A clayless refractory product adapted to maintain its dimensional stability up to 3000° F. and formed at a firing temperature substantially less than 3000° F. and consisting of a mixture fired at said lower temperature comprising in combination: rice hull ash being a mixture of the class of "pink" and "black" ash having silica present principally in cristobalite and tridymite forms, and an alkaline earth metal oxide present in an amount of between 2% and 7% by weight of the mix adapted to form a silica-alkaline earth metal oxide bond with said silica when the mixture is fired at said firing temperature, the said alkaline earth metal oxide being substantially the sole constituent in said mix adapted to form a ceramic bond with the silica thereof, and an organic binder in said mix for providing "green" strength thereof before firing but carbonizable at firing temperatures.

6. A clayless refractory product adapted to maintain its dimensional stability up to 3000° F. and formed at a firing temperature substantially less than 3000° F. and consisting of a mixture fired at said lower temperature comprising in combination: rice hull ash being a mixture of the class of "pink" and "black" ash having silica present principally in cristobalite and tridymite forms, and an alkaline earth metal oxide present in an amount of between 2% and 7% by weight of the mix adapted to form a silica-alkaline earth metal oxide bond with said silica when the mixture is fired at said firing temperature, the said alkaline earth metal oxide being substantially the sole constituent in said mix adapted to form a ceramic bond with the silica thereof, and an organic binder in said mix for providing "green" strength thereof before firing but carbonizable at firing temperatures, the "black" and "pink" ash constituents of said rice hull ash giving rise to oppositely moving dimensional changes in said product as the latter is subjected to changes in temperature, the said "black" and "pink" ash being proportioned to substantially cancel their respective dimensional changes with temperature.

7. A clayless refractory product adapted to maintain its dimensional stability up to 3000° F. and formed at a firing temperature substantially less than 3000° F. and consisting of a mixture fired at said lower temperature comprising in combination: rice hull ash being a mixture of the class of "pink" and "black" ash having silica present principally in cristobalite and tridymite forms, and an alkaline earth metal oxide present in an amount of less than 20% by weight of the mix adapted to form a silica-alkaline earth metal oxide bond with said silica when the mixture is fired at said firing temperature, the said alkaline earth metal oxide being substantially the sole constituent in said mix adapted to form a ceramic bond with the silica thereof, and an organic binder in said mix for providing "green" strength thereof before firing but carbonizable at firing temperatures, the "black" and "pink" ash constituents of said rice hull ash giving rise to oppositely moving dimensional changes in said product as the latter is subjected to changes in temperature, the said "black" and "pink" ash being proportioned to substantially cancel their respective dimensional changes with temperature, the apparent specific gravity of said product being between 2.0 and 2.3, and the apparent porosity as measured by the flotation method between 60% and 75%.

8. A refractory product of dimensions determined by the form into which it is pressed and capable of maintaining such dimensions throughout and after firing and consisting essentially of: rice hull ash, a small portion of an alkaline earth metal oxide, and an organic binder pressed and fired at a temperature greater than 2600° F. but less than the temperature at which the product so formed is intended for use.

9. A method of making a pressed, fired, refractory product having dimensional stability up to 3,000° F. and having the characteristic of practically maintaining its pressed dimensions up to 3,000° F., and consisting of: mixing rice hull ash, an alkaline earth metal oxide and an organic binder in proportions of greater than four of rice hull ash to one of alkaline earth metal oxide, and less than one part of organic binder to twenty of rice hull ash; pressing the mixture to predetermined dimensions; and firing the pressed mixture at a temperature between 2600° F. and 2900° F.

References Cited in the file of this patent

UNITED STATES PATENTS

| | | |
|---|---|---|
| 1,420,284 | Rebuffat | June 20, 1922 |
| 1,831,982 | Wagner | Nov. 17, 1931 |
| 1,924,744 | Lux | Aug. 29, 1933 |
| 1,945,232 | Reiser | Jan. 30, 1934 |

FOREIGN PATENTS

| | | |
|---|---|---|
| 336,440 | Great Britain | 1930 |